United States Patent [19]

Grover et al.

[11] Patent Number: 4,957,715
[45] Date of Patent: Sep. 18, 1990

[54] GAS TREATMENT PROCESS

[75] Inventors: Bhadra S. Grover, Pound Ridge, N.Y.; Moez M. Nagji, Stamford, Conn.

[73] Assignee: UOP, Des Plaines, Ill.

[21] Appl. No.: 181,780

[22] Filed: Apr. 15, 1988

[51] Int. Cl.$^5$ .................... C01B 17/16; C01B 31/20; B01D 53/02; B01D 11/00

[52] U.S. Cl. .................... 423/228; 55/33; 55/73; 55/75; 55/76; 423/229; 423/230; 423/231; 423/232; 423/416

[58] Field of Search ............ 423/228, 229, 232, 230, 423/231, 416; 55/73, 75, 76, 33

[56] References Cited

U.S. PATENT DOCUMENTS

| | | | |
|---|---|---|---|
| 2,886,405 | 5/1959 | Benson et al. | 23/3 |
| 3,563,695 | 2/1971 | Benson | 23/2 |
| 3,563,696 | 2/1971 | Benson | 23/2 |
| 3,685,960 | 8/1972 | Benson | 423/229 |
| 3,823,222 | 7/1974 | Benson | 423/223 |
| 3,864,460 | 2/1975 | Connell | 423/574 |
| 4,160,810 | 7/1979 | Benson et al. | 423/220 |
| 4,238,463 | 12/1980 | Nicksil | 423/226 |
| 4,702,898 | 10/1987 | Grover | 423/220 |
| 4,717,552 | 1/1988 | Carnell et al. | 423/230 |
| 4,830,733 | 5/1989 | Nagji et al. | 208/208 R |
| 4,830,734 | 5/1989 | Nagji et al. | 208/208 R |

Primary Examiner—John Doll
Assistant Examiner—Lori F. Cuomo
Attorney, Agent, or Firm—Thomas K. McBride; John G. Tolomei; Warren K. Volles

[57] ABSTRACT

A process for the removal of carbon dioxide, hydrogen sulfide and alkyl mercaptans from a hydrocarbon-containing feed gas:
(a) contacting the feed gas with an adsorbent capable of removing hydrogen sulfide and alkyl mercaptans from the feed gas at effective conditions to produce a treated gas having reduced concentrations of hydrogen sulfide alkyl mercaptans;
(b) contacting the treated gas with a liquid medium capable of removing carbon dioxide hydrogen sulfide and alkyl mercaptans from the treated gas at effective conditions to produce a product gas having reduced concentrations of carbon dioxide hydrogen sulfide and alkyl mercaptans;
(c) contacting a spent absorbent laden with hydrogen sulfide and alkyl mercaptans with a normally liquid fraction at effective desorption conditions to produce a regenerated adsorbent and a regeneration effluent having increased concentrations of hydrogen sulfide and alkyl mercaptans; and
(d) utilizing the regenerated adsorbent as at least a portion of the adsorbent in step (a).

30 Claims, 1 Drawing Sheet

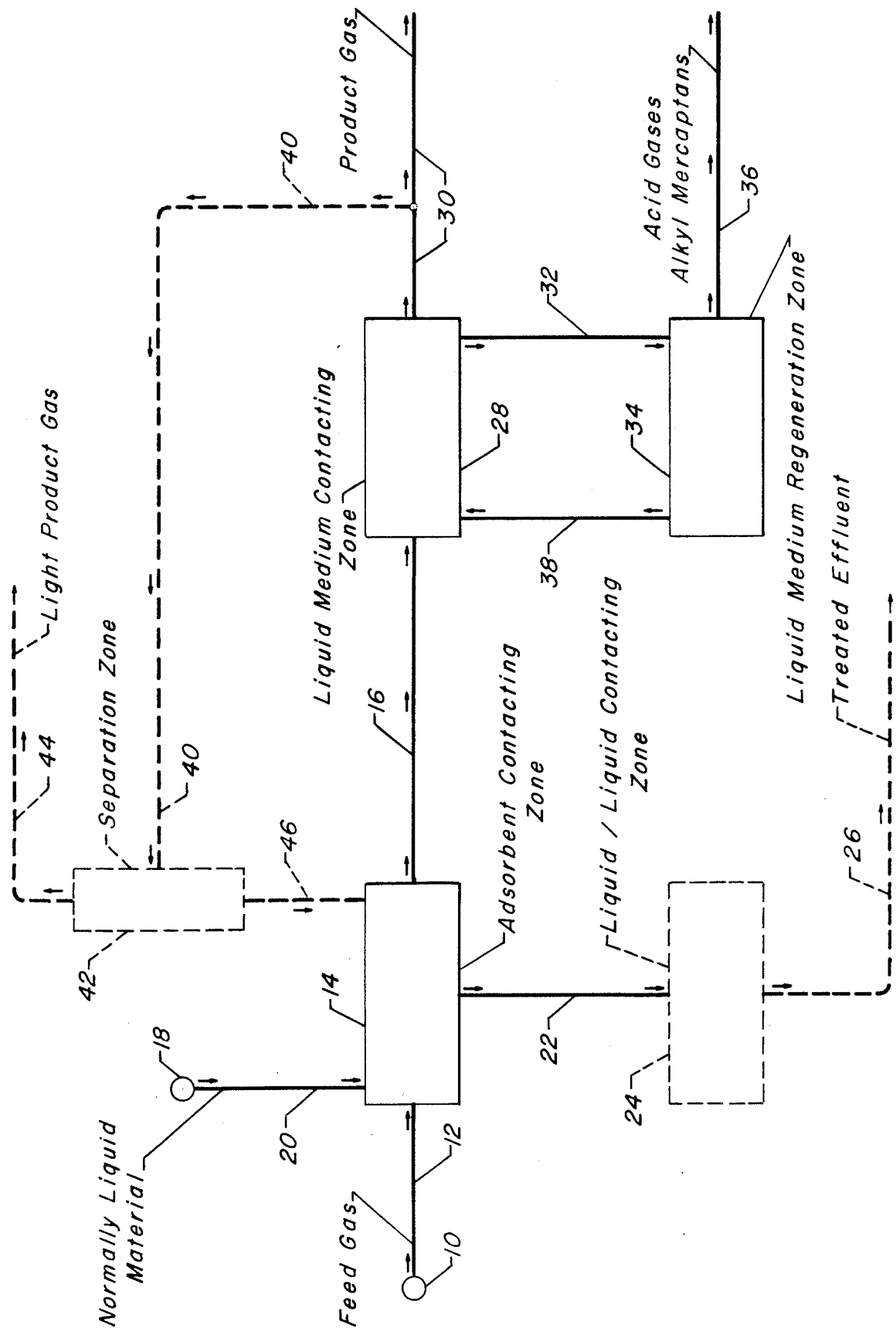

GAS TREATMENT PROCESS

BACKGROUND OF THE INVENTION

This invention relates to the purification of hydrocarbon-containing gaseous mixtures. More particularly, this invention relates to the purification of hydrocarbon-containing gaseous mixtures which includes both carbon dioxide and one or more sulfur-containing compounds, such as hydrogen sulfide, alkyl mercaptans, carbonyl sulfide and the like.

In recent years, natural gas producers have become more and more dependent on "sour" gas sources than ever before. As used herein, a "sour" gas is defined as a hydrocarbon-containing gas which includes hydrogen sulfide and/or alkyl mercaptans. Such sulfur-containing compounds should be removed in order to obtain high quality, fuel grade natural gas and liquified petroleum gas products. In particular, natural gas is often used as a feed material for the production of ammonia. In this situation, it is advantageous to reduce the hydrogen sulfide and alkyl mercaptan contents of the natural gas to avoid problems, in the ammonia production process. In addition, such sour gases often include substantial amounts of carbon dioxide, and possibly carbonyl sulfide. The carbon dioxide in such hydrocarbon-containing gases acts as a diluent and is advantageously removed prior to using the gas.

Thus, hydrocarbon-containing gases which include both carbon dioxide and sulfur-containing compounds at undesirably high levels must be treated to reduce or eliminate the presence of such components. Heretofore it has been very difficult to provide an economically effective process to reduce both the concentrations of carbon dioxide and mixtures of sulfur-containing compounds in such hydrocarbon-containing gases.

Prior art processing involving the use of alkaline solutions, such as aqueous solutions of potassium carbonate and alkanolamines, are effective to reduce the carbon dioxide concentration in such gases to an acceptably low level. In addition, such absorption technology can reduce the concentrations of hydrogen sulfide and carbonyl sulfide to acceptably low levels. However, such technology does not reduce the level of alkyl mercaptans sufficiently to meet high quality, e.g., ammonia feedstock, specifications. Other technologies, in particular adsorption technologies, have been found to be useful to reduce alkyl mercaptan concentrations to acceptably low levels. However, such adsorption technologies do not economically reduce the level of carbon dioxide in the gas. Moreover, certain adsorbents themselves actually produce carbonyl sulfide during the adsorption of other sulfur-containing compounds.

A typical adsorption process comprises passing a sulfur-containing, hydrocarbon-containing gaseous stream through a bed of a molecular sieve adsorbent having a pore size large enough to adsorb the sulfur impurities, and removing the non-adsorbed effluent hydrocarbon until a desired degree of loading of the adsorbent with sulfur-containing impurities is obtained. Thereafter, the adsorbent mass is regenerated by desorbing the sulfur-containing compounds from the spent sorbent.

The adsorbent regenerating operation is conventionally a thermal swing, or combined thermal and pressure swing, operation. When treating a hydrocarbon-containing gas with an adsorbent, such as crystalline zeolitic molecular sieves, a purge gas is provided to regenerate the sulfur compound laden adsorbent. Generally a slipstream of product gas produced while the adsorbent is operated in the adsorption mode is utilized as the desorption gas. The utilization of this product gas for regeneration purposes disadvantageously reduces the final product gas yield. In addition, the regeneration effluent, i.e., the purged gas leaving the adsorbent bed with the sulfur compounds, must be discarded and is often used as fuel, flared or otherwise disposed of at little or no value.

A need exists to provide a process for efficiently and effectively removing carbon dioxide, hydrogen sulfide and alkyl mercaptans from hydrocarbon-containing gaseous streams, particularly when such components are present in such streams in relatively high concentrations.

SUMMARY OF THE INVENTION

A new process for the removal of carbon dioxide, hydrogen sulfide and alkyl mercaptans from a hydrocarbon-containing feed gas has been discovered. The present process provides for high ultimate yields of high quality product gas. This process efficiently and effectively produces a product gas having acceptably low concentrations of carbon dioxide, hydrogen sulfide, alkyl mercaptans and carbonyl sulfide. For example, the present process can be used to produce a product gas which can be utilized to produce ammonia. Moreover, these benefits are obtained while taking advantage or many, if not all, of the cost economies obtainable with both adsorption and absorption technologies.

In a broad aspect, the present process comprises: contacting the feed gas with an adsorbent capable of removing hydrogen sulfide and alkyl mercaptans to produce a treated gas; contacting the treated gas with a liquid medium capable of removing carbon dioxide, hydrogen sulfide and alkyl mercaptans to produce a product gas; contacting a spent adsorbent laden with hydrogen sulfide and alkyl mercaptans with a normally liquid fraction or material to produce a regenerated adsorbent and a regeneration effluent; and utilizing the regenerated adsorbent as at least a portion of the adsorbent in the feed gas contacting step noted above. Conventionally used adsorbents, and adsorption and desorption conditions may be employed. In addition, conventionally used liquid media and conditions may be employed to process the treated gas.

Substantial benefits, e.g., as described herein, are achieved in using a normally liquid fraction or material as the regeneration medium in regenerating the spent adsorbent. Such normally liquid fractions have been found to be very effective in aiding the regeneration of the adsorbent. In many instances, particularly when crystalline zeolite molecular sieves are used as the adsorbent, quantities of carbonyl sulfide are formed during the feed gas/adsorbent contacting and adsorbent regeneration steps. When this happens, the regeneration effluent includes at least a portion of this formed carbonyl sulfide. Further, if desired, the resulting normally liquid regeneration effluent can be easily and effectively freed of sulfur-containing compounds, e.g., using conventional liquid/liquid processing, thereby producing a high quality and valuable product effluent. Thus, both the product gas and, ultimately, the normally liquid fraction or material may be recovered as high quality, valuable products.

DETAILED DESCRIPTION OF THE INVENTION

The feed gases processed in accordance with the present invention can generally be any hydrocarbon-containing gas which also includes carbon dioxide, hydrogen sulfide and alkyl mercaptans. The origin of the feed gas and its specific chemical make-up (other then as noted herein) are not narrowly critical to the present invention. Thus, the feed gas may be a hydrocarbon stream resulting from the destructive hydrogenation of coal or it may be obtained from deposits of natural gas or petroleum. The feed gas is preferably constituted so that it is substantially gaseous at the conditions of the feed gas contacting, and more preferably also at the conditions of the treated gas contacting, described herein. The feed gas preferably includes hydrocarbon molecules containing 1 to about 8 carbon atoms. More preferably, the major amount, i.e., about 50% or more, of the hydrocarbon molecules in the feed gas contain 1 to about 4 carbon atoms. In one embodiment, the feed gas includes a minor amount of hydrocarbons containing at least about 4, preferably at least about 5, carbon atoms per molecule. In this embodiment, at least a portion of the normally liquid fraction or material, described herein, is derived from the product gas, which also contains a minor amount of hydrocarbons containing at least about 4, preferably at least about 5, carbon atoms per molecule. A particularly preferred feedstock for treatment in accordance with the present invention is sour natural gas.

The amount of carbon dioxide present in the feed gas is not narrowly critical to the present invention. However, from an economic perspective, it is preferred that the carbon dioxide content be such that an economic or processing incentive exists to remove at least a portion of the carbon dioxide from the feed gas. In one embodiment, the carbon dioxide content of the feed gas is preferably at least about 5%, more preferably at least about 15%, by volume of the total feed gas.

The hydrogen sulfide content of the feed gas is not narrowly critical. However, the present process is particularly applicable when the feed gas contains a relatively high concentration of hydrogen sulfide, preferably at least about 100 ppmv and more preferably at least about 500 ppmv.

Similarly, the alkyl mercaptan content of the feed gas is not narrowly critical. Feed gases which contain at least about 20 parts per million by volume (ppmv), and in particular at least about 70 ppmv, are very suitable for the present processing. The alkyl mercaptans which are included in the feed gas are preferably selected from methyl mercaptan, ethyl mercaptan, propyl mercaptans, butyl mercaptans, amyl mercaptans, hexyl mercaptans, heptyl mercaptans, octyl mercaptans, mixtures thereof and the like.

The feed gas may include one or more other impurities, such as carbonyl sulfide and water. Such impurity or impurities are often at least partially removed in the processing of the present invention. Thus, in one embodiment, the product gas preferably has a reduced concentration, relative to the feed gas, of carbonyl sulfide. The product gas preferably contains less than about 5%, more preferably less than about 3%, by volume of carbon dioxide; preferably less than about 5 ppmv, more preferably less than about 3 ppmv, of hydrogen sulfide; preferably less than about 1 ppmv, more preferably less than about 0.5 ppmv, of alkyl mercaptans; and preferably less than about 3 ppmv, more preferably less than about 2 ppmv, of carbonyl sulfide.

This feed gas is contacted with an adsorbent, preferably a solid adsorbent, capable of removing hydrogen sulfide and alkyl mercaptans from the feed gas at conditions effective to produce a treated gas containing reduced concentrations, relative to the feed gas, of hydrogen sulfide and alkyl mercaptans. Often the adsorbent also removes water from the feed gas. The spent adsorbent laden with hydrogen sulfide and alkyl mercaptans, and often water, removed from the feed gas is subjected to contacting with a regeneration medium, as described herein, to at least partially restore its adsorption abilities.

Suitable adsorbents for use in contacting the feed gas include crystalline zeolitic molecular sieves, carbon-based adsorbents, silica gel, activated aluminas, and the like. The adsorbents which are particularly suitable in the process of the invention are the crystalline zeolitic molecular sieves.

The terms "crystalline zeolitic molecular sieve" and "zeolite" refer to a group of naturally occurring and synthetic hydrated metal aluminosilicates which are crystalline in structure. There are, however, significant differences between the various synthetic and natural zeolites in chemical composition, crystal structure and physical properties, such as x-ray powder diffraction patterns.

The structure of the crystalline zeolitic molecular sieves may be described as an open three-dimensional frame-work of $SiO_4$ and $AlO_4$ tetrahedra. These zeolites are activated by driving off substantially all of the water of hydration. The space remaining in the crystals after activation is available for adsorption of molecules having a size, shape and energy which permits entry of the molecules to the pores of the molecular sieves.

Crystalline zeolitic molecular sieves having pores with an apparent pore size of at least about 3.8Å have been found satisfactory when the sulfur compound impurity which is to be adsorbed is hydrogen sulfide. For normal mercaptans having less than seven carbon atoms, the apparent pore size should be at least about 4.6Å. The sulfur compounds of larger molecular dimensions, such as isopropyl mercaptan, isobutyl mercaptan, t-butyl mercaptan and other than normal amyl and hexyl mercaptans, may require the use of a crystalline zeolitic molecular sieve having an apparent pore size of at least about 6Å.

The term "apparent pore size" as used herein may be defined as the maximum critical dimension of the molecular species which is adsorbed by the crystalline zeolitic molecular sieve in question under normal conditions. The apparent pore size will always be larger that the effective pore diameter, which may be defined as the free diameter of the appropriate silicate ring in the zeolite structure.

Among the naturally occurring crystalline zeolitic molecular sieves suitable for use in the present invention include mordenite and chabasite, both having an apparent pore size of about 4Å, and erionite having an apparent pore size of about 10Å.

The preferred synthetic crystalline zeolitic molecular sieves include zeolites A, X, Y and L, each of which has an apparent pore size of about 3Å to about 10Å and which are all well known to those skilled in the art. Reference is made to U.S. Pat. No. 3,620,969 which discusses these zeolites. Particularly preferred are zeolites 4A, 5A, and zeolite 13X, alone or in combination with each other.

The apparent pore size of the crystalline zeolitic molecular sieves may be varied by employing different metal cations. For example, sodium zeolite A (U.S. Pat. No. 2,882,243) has an apparent pore size of about 4Å, whereas calcium zeolite A has an apparent pore size of about 5Å.

The zeolites may occur as agglomerates of fine crystals or may be synthesized as fine powders and are preferably beaded or pelletized for large scale adsorption use. Beading and pelletizing methods are known which are very satisfactory because the sorptive character of the zeolite, both with regard to selectivity and capacity, remains essentially unchanged, Many suitable inert binder materials or compositions are well known in the art including clays, refractory metal oxides and alkali metal silicates, if it is desired to utilize the adsorbents in agglomerated form. In general, the individual molecular sieve crystals are quite small (on the order of 10 microns) and hence, in fixed bed operations at least, it is advantageous to agglomerate the crystals into beads, pellets, extrudate forms, etc., either with or without added binder material.

Preferably, the conditions for adsorption utilizing the crystalline zeolitic molecular sieves include a temperature in the range of about 32° F. to about 200° F., and more preferably a temperature in the range of about 50° F. to about 140° F. at a pressure of about 0.1 psig to about 4000 psig and more preferably about 0 psig to 2000 psig. For desorption, it is desirable to maintain the adsorbent undergoing regeneration at a temperature in the range of about 300° F. to about 700° F., more preferably about 450° F. to about 600° F., at the same pressure range noted for adsorption.

Activated aluminas are porous forms of aluminum oxide of high surface area. Such aluminas are capable of selective adsorption in many applications and are chemically substantially inert to most gases and vapors, are non-toxic and do not soften, swell or disintegrate when immersed in water. High resistance to shock and abrasion are two important physical characteristics of such materials. The adsorbed material may be driven from the activated alumina by suitable choice of reactivating temperature, thus returning the activated alumina to its original adsorptive form.

Activated aluminas may be reactivated to substantially the original adsorptive efficiency by employing a heating medium, e.g., at any temperature in the range of about 250° F. and about 600° F. For more complete regeneration, the temperature of the regeneration effluent exiting the regenerating adsorbent should be at least 350° F.

Silica gel is a granular, amorphous form of silica, made from sodium silicate and sulfuric acid. Silica gel has an almost infinite number of submicroscopic pores or capillaries by which it can act as a selective adsorbent depending upon the polarity and molecular size of the constituents within the stream that is being treated.

The use of these adsorbents as well as adsorbents such as activated carbon and the like, are well known to those skilled in the art and their selection, as well as operating conditions and regenerating conditions are easily ascertainable to those skilled in the art.

The treated gas produced from the feed gas/adsorbent contacting is contacted with a liquid medium capable of removing carbon dioxide and one or more sulfur-containing compounds, such as hydrogen sulfide, alkyl mercaptans and carbonyl sulfide, from the treated gas at conditions effective to produce a product gas containing reduced concentrations, relative to the treated gas, of carbon dioxide and one or more sulfur-containing compounds. Any suitable liquid medium may be used in this contacting step. The liquid medium is preferably regenerable so that it may be repeatedly used, e.g., in a cyclic absorption/regeneration operation.

The use of regenerable liquid media to remove carbon dioxide and sulfur-containing compounds from hydrocarbon-containing gases is conventional and well known in the art. Such conventional processing is included within the scope of the present invention as an embodiment of the treated gas contacting step. Such conventional processing is described, for example, in Benson et al U.S. Pat. No. 2,886,405; and in Benson U.S. Pat. Nos. 3,563,695; 3,563,696; 3,685,960; 3,823,222; and 4,160,810. Each of these patents is incorporated in its entirety be reference herein.

Particularly useful liquid media in the treated gas contacting step of the present invention include aqueous solutions of alkali metal carbonates, particularly potassium carbonate, aqueous solutions of alkanolamines, particularly monoethanolamine and diethanolamine, aqueous solutions of alkali metal phosphates and the like. Particularly preferred are relatively concentrated potassium carbonate aqueous solutions having potassium carbonate concentrations of about 15% to about 45%, more preferably about 20% to about 35%, by weight (these concentrations being calculated on the assumption that all the potassium is present as potassium carbonate). Potassium carbonate aqueous solutions are preferably activated by the addition of additives such as amines, particularly alkanolamines, alkali metal borates, particularly potassium borate and sodium borate, As$_2$O$_3$, amino acids, such as glycine, and other additives which tend to increase the rate of absorption and/or desorption of carbon dioxide and sulfur-containing compounds in the potassium carbonate solution. Particularly preferred additives for potassium carbonate solutions are the alkanolamines added in amounts in the range of about 1% to about 10%, more particularly about 1% to about 6%, by weight. Diethanolamine is very useful from the standpoint of cost, relatively low volatility and effectiveness.

In one specific embodiment, the liquid medium contacting/regeneration takes place in an absorption column and a regeneration column between which the liquid medium, e.g., aqueous potassium carbonate solution, is continuously circulated. Treated gas is preferably heat exchanged against the product gas from the absorption column and then is fed to, the bottom of, the absorption column.

The absorption column may be suitably equipped with means for producing intimate gas-liquid contact. For such purposes, packing materials are used, such as Raschig rings, Berl saddles, Intalox saddles, Pall rings or other types of packing bodies exposing a large surface of liquid to the gas flowing through the packing. In place of packing, other means such as plates, e.g., sieve trays, may be employed to provide intimate gas-liquid contact. The regeneration column similarly may contain packing materials or plates to provide intimate contact between the liquid medium and the stripping steam passing through this column.

In one useful embodiment of the invention, the absorption column is maintained at substantial superatmospheric pressures of at least about 100 psig and preferably at least about 200 psig. Absorption pressure in typical applications of the invention will more preferably be in the range of about 250 psig to about 2000 psig.

In the absorption column, the regenerated liquid medium is supplied to, preferably the top of, the column and flows downwardly through the gas-liquid contact section countercurrently to the treated gas entering the bottom of the column. Acid gases, such as carbon dioxide and hydrogen sulfide, and alkyl mercaptans contained in the treated gas are absorbed by the liquid medium and the product gas leaves the absorption column. At least a portion, and preferably substantially all, of the carbonyl sulfide present in the treated gas is converted to hydrogen sulfide in the absorption column, which hydrogen sulfide is absorbed by the liquid medium.

The liquid medium containing absorbed acid gas and alkyl mercaptans flows into, preferably the top of, the regeneration column where it is contacted with steam to strip acid gases and alkyl mercaptans from the liquid medium to produce a regenerated liquid medium which is returned to the absorption column.

The contacting in the absorption column preferably occurs at a temperature in the range of about 150° F. to about 260° F. Conditions in the regeneration column are preferably set so that at least about 60%, more preferably about 65% to about 80%, of the carbon dioxide present in the liquid medium fed to the regeneration column is removed. The temperature in the regeneration column is preferably in the range of about 175° F. to about 275° F. while the regeneration column pressure is preferably in the range of about 2 psig to about 20 psig.

The feed gas contacting step, discussed previously, preferably produces a treated gas which is substantially free, i.e., less than about 1 ppmv, of alkyl mercaptans, and more preferably produces a treated gas with an alkyl mercaptan concentration which approaches, or is at, an undetectably low level. Thus, the treated gas contacting step may produce a product gas which has substantially the same concentration of alkyl mercaptans as does the treated gas. In effect, the primary removal of alkyl mercaptans occurs in the feed gas contacting step. However, the feed gas contacting step, particularly when one or more crystalline zeolitic molecular sieves are employed, may produce a treated gas having an increased concentration of carbonyl sulfide, relative to the carbonyl sulfide concentration of the feed gas. The treated gas contacting step is effective to remove carbonyl sulfide formed in the feed gas contacting step. Thus, the feed gas contacting step and the treated gas contacting step in combination produce a product gas having reduced concentrations of carbon dioxide and sulfur-containing compounds, relative to the concentrations of such components in the feed gas.

In order to regenerate the adsorbent, the spent adsorbent is contacted with a normally liquid fraction or material at effective desorption conditions to produce a regenerated adsorbent and a normally liquid regeneration effluent containing increased concentrations, relative to the normally liquid fraction or material, of hydrogen sulfide and alkyl mercaptans. The term "normally liquid" as used herein refers to a fraction or material the major portion, i.e., at least about 50%, preferably at least about 70%, by weight of which is made up of one or more compounds having a critical temperature of at least 100° F. The regeneration effluent preferably includes substantially all of the alkyl mercaptans removed from the feed gas.

The normally liquid fraction or material useful in the present spent adsorbent contacting step as a regeneration medium may be any suitable component or mixture of components useful to function as described herein. This material should have no substantial adverse effect on the adsorbent being regenerated.

In one embodiment, the normally liquid material is substantially gaseous during at least a portion, or substantially all, of the spent adsorbent/regeneration medium contacting step. Since the normally liquid material is substantially gaseous during at least a portion of the spent adsorbent contacting, a reduced amount of the normally liquid material is used relative to using a material which remains liquid throughout the entire spent adsorbent/regeneration medium contacting. Moreover, since the normally liquid regeneration effluent can be effectively desulfurized using conventional liquid/liquid processing techniques, e.g., as discussed herein, the desulfurized regeneration effluent can be recycled as at least a portion of the regeneration medium, if desired.

The regenerated adsorbent is preferably present in a substantially gaseous environment prior, more preferably immediately prior, to utilizing it in adsorption service. If the regenerated adsorbent is in a liquid environment, processing difficulties, such as upsets in the liquid medium contacting step and reduced adsorbent capacity, could result. Having the regenerated adsorbent in a gaseous medium prior to it being used as an adsorbent results in a more effective and smooth overall process operation.

The normally liquid fraction or material used as the regeneration medium may provide this preferred substantially gaseous environment, for example, where this normally liquid material or fraction is substantially gaseous at the conditions of the feed gas/adsorbent contacting.

In order to provide this preferred substantially gaseous environment where the normally liquid regeneration medium is substantially liquid at the feed gas/adsorbent contacting conditions, the regenerated adsorbent may be contacted with a substantially gaseous medium prior to utilizing the regenerated adsorbent in adsorption service. After contacting the regenerated adsorbent, the substantially gaseous medium may be used to contact other regenerated adsorbent and/or may be subjected to the liquid medium contacting. In one particularly useful embodiment, the spent adsorbent is heated, i.e., to a temperature higher than that employed during adsorption service, in the presence of a normally liquid fraction or material to produce the regenerated adsorbent. A relatively cool, substantially gaseous medium is then contacted with the regenerated adsorbent. This contacting cools the regenerated adsorbent and places it in a substantially gaseous environment, ready for use in adsorption service.

Any suitable substantially gaseous medium may be employed to contact, and preferably cool, the regenerated adsorbent, provided that it functions as described herein and has no substantial adverse effect on the regenerated adsorbent. Such medium is preferably substantially gaseous at the conditions of the feed gas/adsorbent contacting. Examples of substantially gaseous media which may be employed are portions of the feed gas, treated gas, product gas, mixtures thereof and the like. A portion of the product gas e.g., the light or low boiling fraction of the product gas, is a very useful substantially gaseous medium.

The normally liquid regeneration medium preferably includes a major amount by weight of hydrocarbons containing at least about 4 carbon atoms per molecule, more preferably at least about 5 carbon atoms per molecule, and still more preferably includes at least about 70% by weight of hydrocarbons containing about 5 to about 10 carbon atoms per molecule. In a particularly useful embodiment, the regeneration effluent is derived, at least in part, from the feed gas. For example, the product gas may be fractionated to produce the normally liquid material. Alternately, the liquid material may be the product of the downstream processing of the product gas. Also, if the treated gas is amenable to separation, e.g., has a sufficiently low concentration of carbon dioxide to allow economic fractionation, it can be used to produce the normally liquid material.

The spent adsorbent regeneration may be conducted at temperatures and pressures which are conventional and well known in the art. In one embodiment in which the adsorbent is one or more crystalline zeolitic molecular sieves, this regeneration procedure involves heating the spent adsorbent with the regeneration medium to effective desorption conditions to produce the regenerated adsorbent; and cooling the regenerated adsorbent, preferably by contact with a substantially gaseous medium, as described herein, prior to using the regenerated adsorbent in adsorption service. Thus, the adsorbent is preferably substantially continuously cycled between adsorption service, heating and cooling.

In order to provide improved regeneration efficiency, the pressure at which the spent adsorbent is contacted with the normally liquid regeneration medium is reduced relative to the adsorption pressure. The pressure can be increased to the desired adsorption pressure prior to placing the regenerated adsorbent into adsorption service, preferably prior to cooling the regenerated adsorbent.

Various processing configurations may be employed in accomplishing the adsorbent regeneration. One particularly useful processing scheme involves a series of four (4) vessels each with one or more fixed beds of adsorbent. At any one time, two of the vessels are in adsorption service, removing sulfur-containing compounds from the feed gas, while the other two vessels are at different stages in the adsorbent regeneration procedure. This processing scheme effectively maintains substantially continuous, steady state adsorption capacity and provides a "smooth" operation for the ultimate production of high quality, product gas.

The normally liquid regeneration effluent, laden with sulfur-containing compounds from the absorbent, may be effectively disposed of or may be suitable for use, e.g., as a component of a gasoline pool or otherwise as a fuel, as is. However, in one embodiment, the regeneration effluent is further processed to produce a treated effluent having a reduced concentration, relative to the regeneration effluent, of sulfur-containing compounds. The treated effluent may be used as at least a part of the regeneration medium or may be used in some other service. This further processing can be conducted in a conventional manner since the regeneration effluent is normally liquid. Thus, the regeneration effluent in substantially liquid form can be contacted with a liquid medium, e.g., other than the liquid medium used to contact the treated gas, capable of selectively removing at least one sulfur-containing compound from the regeneration effluent at conditions effective to produce a treated effluent having a reduced concentration, relative to the regeneration effluent, of sulfur-containing compounds. In one particularly useful embodiment, the liquid medium, e.g., an aqueous liquid medium, includes an effective amount of at least one chelating compound, e.g., such as one or more metal complexes, capable of selectively removing at least one sulfur-containing compound from the regeneration effluent. Among the useful processes to produce a treated effluent is a process identified as the Merox Process and distributed by UOP, Des Plaines, IL.

The present process may very conveniently be practiced in a continuous manner, preferably in a substantially steady state continuous manner. In such a continuous operation, the regeneration medium which may be derived from product gas produced by contacting the feed gas with one mass of adsorbent is often used to regenerate another mass of spent adsorbent. Each mass of adsorbent is cycled between feed gas contacting and regeneration. This type of operation is understood to be within the scope of the present invention and claims.

If desired, the product gas may be contacted with an auxiliary sorbent at conditions effective to remove sulfur-containing compounds, e.g., hydrogen sulfide, alkyl mercaptans, carbonyl sulfide and the like, from the product gas and produce a treated product gas essentially free, i.e., less than about 1 ppmv, of sulfur-containing compounds.

The adsorbents that are suitable for use as auxiliary sorbents in the present process are preferably chemisorbents which chemically react with the sulfur-containing compounds. Generally, these materials are not readily regenerable and must be discarded and replenished when they are laden with sulfur-containing materials. These chemisorbents are preferably capable of selectively removing sulfur-containing compounds from the product gas.

Suitable auxiliary sorbents that are applicable in the present invention include zinc oxide; iron sponge; causticized alumina; impregnated carbon, such as carbon impregnated with iodine or metallic cations; zeolite A, zeolite X and zeolite Y, all of which have been ion exchanged with at least one of zinc, copper and iron cations; chelating compounds; mixtures thereof and the like.

Zinc oxide is a particularly useful auxiliary sorbent.

The product gas may be further contacted with an additional adsorbent, e.g., such as one or more of the crystalline zeolitic molecular sieves, capable of removing water from such gas streams at conditions effective to remove water from the product gas, preferably to produce a substantially dry product gas.

BRIEF DESCRIPTION OF THE DRAWING

The drawing is a block diagram illustrating one embodiment of the present process.

DETAILED DESCRIPTION OF THE DRAWING

Referring now to the drawing, a wet, natural gas feed gas is provided from source 10. This feed gas contains about 1% by volume (mole %) of nitrogen, about 20% by volume of carbon dioxide, about 1000 ppmv of hydrogen sulfide, about 100 ppmv of alkyl mercaptans and about 30 ppmv of carbonyl sulfide. This feed gas, 100 million standard cubic feet per day (MMSCF/D), is passed through line 12 to an adsorbent contacting zone 14.

Adsorbent contacting zone 14 includes a series of four (4) adsorbers which operate in a cyclic manner. Thus, at any one time, two (2) of the adsorbers in zone 14 are in adsorption service while the other two (2) adsorbers are in various stages, e.g., heating mode or cooling mode, of the adsorbent regeneration procedure. This adsorbent regeneration involves heating the spent adsorbent by contact with a relatively hot regeneration medium (described hereinafter) to remove sulfur-containing compounds from the adsorbent, and then cooling the regenerated adsorbent by contact with a relatively cool, substantially gaseous portion of the product gas prior to placing the regenerated adsorbent into adsorption service.

Each of the adsorbers in zone 14 includes a fixed bed of zeolite 5A molecular sieve. While in adsorption service, the conditions within the adsorber include a temperature of about 85° F. and a pressure of about 1650 psig. The adsorbent contacting zone 14 produces a treated natural gas which exits zone 14 through line 16. This treated natural gas is substantially dry, includes about 20% by volume of carbon dioxide, about 5 ppmv of hydrogen sulfide and about 1 ppmv of alkyl mercaptans. In addition, carbonyl sulfide is formed while the feed gas is contacted with the adsorbent so that the treated natural gas from zone 14 includes about 100 ppmv of carbonyl sulfide. During adsorbent regeneration, carbonyl sulfide is formed which leaves zone 14 in the regeneration effluent.

During the adsorbent regeneration procedure, the spent adsorbent, laden with water, hydrogen sulfide, alkyl mercaptans and carbonyl sulfide, is contacted with a normally liquid material from source 18. This material from source 18 is fed to zone 14 through line 20. The normally liquid material from source 18 is comprised of hydrocarbons including five (5) and six (6) carbon atoms per molecule. This normally liquid material is heated prior to contacting the spent adsorbent. Contacting the spent adsorbent with this heated material results in increasing the temperature of the adsorbent. During the time this heated, normally liquid material or regeneration medium is contacted with the adsorbent, it is in the gaseous state. A normally liquid regeneration effluent is produced from this contacting which leaves zone 14 through line 22 and is liquified by cooling. The regeneration effluent may be indirectly heat exchanged against the regeneration medium to heat the regeneration medium prior to contact with the spent adsorbent in zone 14. The normally liquid regeneration effluent includes water, hydrogen sulfide, alkyl mercaptans and carbonyl sulfide removed from the adsorbent. A substantially gaseous portion of the product gas, such as a portion of the light product gas in line 44, described hereinafter, is cooled and contacted with the heated, regenerated adsorbent to cool this material to the temperature employed during adsorption. The cooled regenerated adsorbent, in a gaseous environment, is now ready to be reused in adsorption service. The light product gas, after cooling the regenerated adsorbent, is processed in liquid medium contacting zone 28, described hereinafter.

Portions of the drawing are shown in shadow lines to denote possible processing alternatives.

Instead of discarding (flaring) the relatively heavily contaminated regeneration effluent or using it as is, this liquid effluent may be subjected to conventional Merox processing in liquid/liquid contacting zone 24. Such Merox processing acts to reduce the concentration of sulfur-containing compounds in the regeneration effluent and produce a treated effluent which becomes zone 24 through line 26. This treated effluent may be recycled to the adsorbent contacting zone 14 (as part of the regeneration medium) or used in another useful service.

The treated natural gas from zone 14 is fed through line 16 to liquid medium contacting zone 28. Zone 28 includes a conventional counter-current contactor where the natural gas product from line 16 is contacted with an aqueous solution containing potassium carbonate. Zone 28 is operated at conventional conditions, including a temperature of about 200° F. and a pressure of about 1650 psig. In order to conserve energy, the wet product gas produced in this contacting, which leaves zone 28 through line 30, may be heat exchanged against the treated natural gas being fed to zone 28 through line 16.

This contacting in zone 28 produces a wet product gas which contains about 1.5% by volume of carbon dioxide, about 2 ppmv of hydrogen sulfide, about 0.3 ppmv of alkyl mercaptans and about 1 ppmv of carbonyl sulfide. Substantially all of the carbonyl sulfide in the treated natural gas from line 16 is converted to hydrogen sulfide in zone 28. An acid gas-rich aqueous potassium carbonate solution is withdrawn from zone 28 through line 32 and fed to a liquid medium contacting zone 34. In zone 34, the solution from line 32 is subjected to a conventional regeneration procedure, e.g., steam stripping, to remove contained carbon dioxide, hydrogen sulfide, and alkyl mercaptans, which leave zone 32 through line 36. The regenerated aqueous potassium carbonate solution is returned to zone 28 through line 38 for further use.

The wet product gas in line 30 has sufficiently low concentrations of hydrogen sulfide and alkyl mercaptans to be acceptable as a feedstock for the production of ammonia. If desired, the wet product gas may be subjected to drying to produce a substantially dry product gas.

One processing alternative illustrated in the drawing is applicable where the feed gas from source 10 includes an amount of hydrocarbons containing at least 4 or 5 carbon atoms per molecule. In this situation, the wet product gas from line 30 (or the substantially dry product gas, if desired) is fed through line 40 to a separation zone 42, e.g., one or more fractional distillation columns. Separation zone 42 produces a light product gas, which exits zone 42 through line 44, and a normally liquid fraction, which exits zone 42 through line 46. This normally liquid fraction includes a major amount of hydrocarbons containing at least about 4 carbon atoms per molecule.

This normally liquid fraction, which is substantially gaseous at the conditions of the spent adsorbent/regeneration medium contacting, may be used as part of, or in place of, the regeneration medium, described above.

The present process removes carbon dioxide, hydrogen sulfide, alkyl mercaptans and carbonyl sulfide to levels as low as desired. The sulfur-containing compounds are preferably removed to almost undetectable levels. The use of a normally liquid regeneration medium is effective to regenerate the adsorbent and, in addition, allows the regeneration effluent to be effectively used as is, or desulfurized using conventional "liquid/liquid" processing. In short, the present process efficiently and effectively makes use of both adsorption and absorption technologies to produce high yields of high quality hydrocarbon-containing gases, e.g., useful as ammonia feedstocks.

While this invention has been described with respect to various specific examples and embodiments, it is to be understood that the invention is not limited thereto and that it can be variously practiced within the scope of the following claims.

What is claimed is:

1. A process for the removal of carbon dioxide, hydrogen sulfide and alkyl mercaptans from a feed gas containing hydrocarbons having from 1 to about 8 carbon atoms per molecule comprising:
   (a) contacting the feed gas with an adsorbent capable of removing hydrogen sulfide and alkyl mercaptans from the feed gas at effective conditions to produce a treated gas having reduced concentrations of hydrogen sulfide and alkyl mercaptans relative to the feed gas;
   (b) contacting the treated gas with a liquid medium capable of removing carbon dioxide, hydrogen sulfide and alkyl mercaptans from the treated gas at effective conditions to produce a product gas having reduced concentrations of carbon dioxide, hydrogen sulfide and alkyl mercaptans relative to the treated gas and an acid gas-rich effluent;
   (c) separating the product gas into a low boiling fraction and a high boiling fraction, said high boiling fraction comprising at least 50% by weight of hydrocarbons having at least 4 carbon atoms per molecule;
   (d) contacting a spent adsorbent laden with hydrogen sulfide and alkyl mercaptans with a normally liquid regeneration medium comprising at least a portion of said high boiling fraction at effective desorption conditions to maintain said regeneration medium substantially in the vapor phase and produce a regenerated adsorbent and a regeneration effluent having increased concentrations of hydrogen sulfide and alkyl mercaptans; and
   (e) utilizing the regenerated adsorbent as at least a portion of the adsorbent in step (a).

2. The process of claim 1 wherein the high boiling fraction comprises hydrocarbons having at least 5 carbon atoms per molecule.

3. The process of claim 1 which further comprises cooling the regenerated adsorbent by contacting with a substantial gaseous medium.

4. The process of claim 1 which further comprises cooling the regenerated adsorbent by contacting with a substantially gaseous medium comprising at least a portion of the low boiling fraction.

5. The process of claim 4 which further comprises recycling the substantially gaseous medium to step (b).

6. The process of claim 1 wherein carbonyl sulfide is formed during step (a), the spent adsorbent is further laden with carbonyl sulfide and the regeneration effluent further contains an increased concentration of carbonyl sulfide.

7. The process of claim 1 which further comprises contacting the regeneration effluent with a second liquid medium capable of removing at least one sulfur-containing compound from the regeneration effluent at conditions effective to produce a treated effluent having a reduced concentration of sulfur-containing compounds.

8. The process of claim 1 wherein the product gas contains less than about 5 ppmv of hydrogen sulfide, less than about 1 ppmv of alkyl mercaptans and less than about 3 ppmv of carbonyl sulfide.

9. The process of claim 1 wherein the product gas contains less than about 3 ppmv of hydrogen sulfide, less than about 0.5 ppmv of alkyl mercaptans and less than about 2 ppmv of carbonyl sulfide.

10. The process of claim 9 wherein the feed gas contains at least about 5% by volume of carbon dioxide and at least about 20 ppmv of alkyl mercaptans.

11. The process of claim 9 wherein the feed gas contains at least about 15% by volume of carbon dioxide and at least about 70 ppmv of alkyl mercaptans.

12. The process of claim 1 wherein the liquid medium is an aqueous medium.

13. The process of claim 12 wherein the aqueous medium includes at least one component selected from the group consisting of alkali metal carbonates, alkanolamines and mixtures thereof.

14. The process of claim 7 wherein the second liquid medium includes at least one chelating compound capable of selectively removing at least one sulfur-containing compound from the regeneration effluent.

15. The process of claim 1 wherein the adsorbent is selected from the group consisting of crystalline zeolitic molecular sieves, carbon based adsorbents, silica gels, activated aluminas and mixtures thereof.

16. The process of claim 15 wherein the crystalline zeolitic molecular sieves have an apparent pore size of at least about 4.6Å.

17. The process of claim 15 wherein the crystalline zeolitic molecular sieves have an apparent pore size of at least about 6Å.

18. The process of claim 15 wherein the crystalline zeolitic molecular sieve is selected from the group consisting of zeolite 5A, zeolite 13X, zeolite 4A and mixtures thereof.

19. The process of claim 1 wherein the temperature at which step (d) occurs is higher than the temperature at which step (a) occurs.

20. The process of claim 19 wherein the temperature at which step (d) occurs is in the range of about 300° F. to about 700° F.

21. The process of claim 19 wherein the temperature at which step (d) occurs is in the range of about 450° F. to about 600° F.

22. The process of claim 19 wherein the normally liquid fraction to be used in step (d) is heated by indirect heat exchange with the regeneration effluent.

23. The process of claim 3 wherein the regenerated adsorbent is cooled to a temperature is the range of about 32° F. to about 200° F. prior to being reused in step (a).

24. The process of claim 23 wherein the regenerated adsorbent is cooled to a temperature in the range of about 50° F. to about 140° F. prior to being reused in step (a).

25. The process of claim 1 wherein a liquid medium from step (b) containing carbon dioxide, hydrogen sulfide and alkyl mercaptans is treated to produce a treated liquid medium having reduced concentrations of carbon dioxide, hydrogen sulfide and alkyl mercaptans which treated liquid medium is reused as at least a portion of the liquid medium in step (b).

26. The process of claim 1 which further comprises contacting at least a portion of the product gas with an auxiliary sorbent at conditions effective to remove sulfur-containing compounds from the product gas and produce a treated product gas essentially free of sulfur-containing compounds.

27. The process of claim 26 wherein the auxiliary sorbent is selected from the group consisting of zinc oxide; iron sponge; causticized alumina; impregnated carbon; zeolite A, zeolite X and zeolite Y, all of which have been ion exchanged with at least one of zinc, copper and iron cations; chelating compounds and mixtures thereof.

28. A process for the removal of carbon dioxide, hydrogen sulfide, and alkyl mercaptans and carbonyl sulfide from a feed gas containing hydrocarbons having from 1 to about 8 carbon atoms per molecule:

(a) contacting the feed gas with an adsorbent including at least one crystalline zeolitic molecular sieve at conditions effective to produce a treated gas having reduced concentrations of hydrogen sulfide and alkyl mercaptans relative to the feed gas;

(b) contacting the treated gas with an aqueous, liquid medium containing at least one alkali metal carbonate at conditions effective to produce a product gas having a reduced concentration of carbon dioxide hydrogen sulfide, alkyl mercaptans and carbonyl sulfide relative to the treated gas, and an acid gas-rich liquid medium;

(c) separating the product gas into a low boiling fraction and a high boiling fraction, said high boiling fraction comprising at least 50% by weight of hydrocarbons containing at least 4 carbon atoms per molecule;

(d) contacting a spent adsorbent laden with hydrogen sulfide and alkyl mercaptans with at least a portion of said high boiling fraction at effective conditions to maintain said regeneration medium in the vapor phase and produce a regenerated adsorbent and a regeneration effluent containing increased concentrations of hydrogen sulfide and alkyl mercaptans;

(e) cooling the regenerated adsorbent by contacting with a substantially gaseous fraction;

(f) using the regenerated adsorbent as at least a portion of the adsorbent in step (a);

(g) contacting the regeneration effluent at conditions effective to remove sulfur-containing components from the regeneration effluent and produce a treated effluent having a reduced concentration of sulfur-containing compounds;

(h) contacting the acid gas-rich liquid medium at conditions effective to produce a regenerated liquid medium having a reduced concentration of carbon dioxide, hydrogen sulfide and alkyl mercaptans; and (i) using the regenerated liquid medium as at least a portion of the aqueous liquid medium in step (b).

29. The process of claim 28 wherein the substantially gaseous fraction comprises at least a portion of the low boiling fraction.

30. The process of claim 29 which further comprises recycling the substantially gaseous medium to step (b).

* * * * *